F. O. COOLEY & A. J. MILLIGAN.
AUTOMOBILE JACK.
APPLICATION FILED NOV. 27, 1914.
1,167,049.
Patented Jan. 4, 1916.
4 SHEETS—SHEET 2.
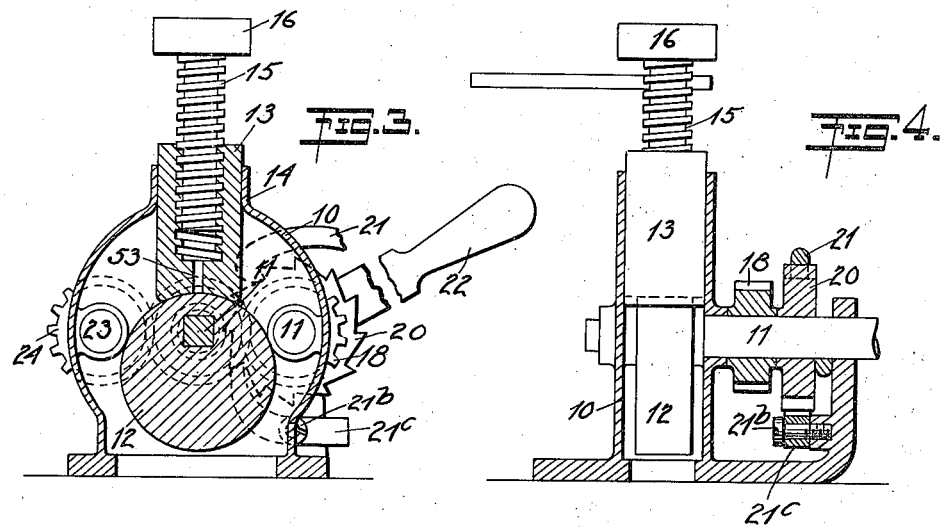
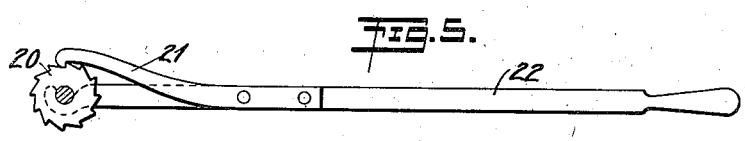
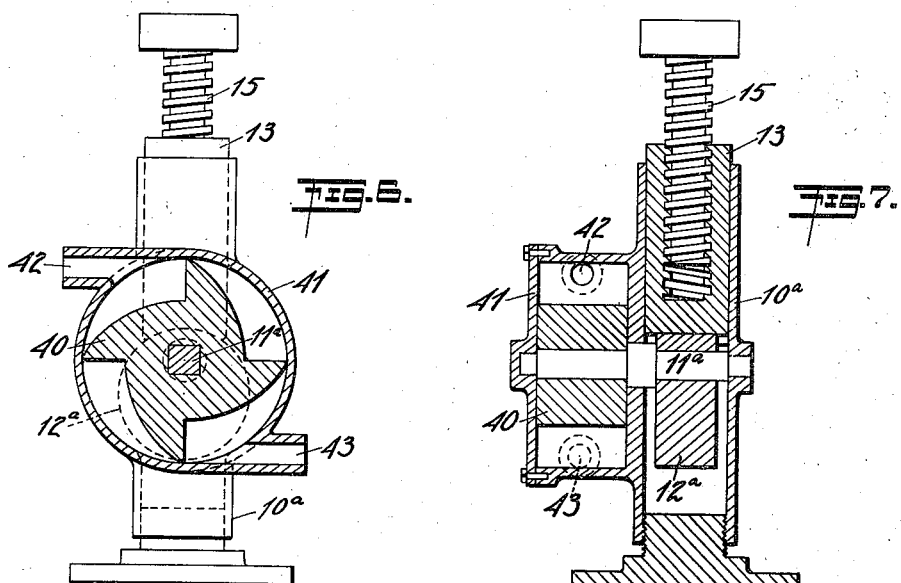
WITNESSES
INVENTORS
Fred O. Cooley
Alfred J. Milligan
BY
ATTORNEYS

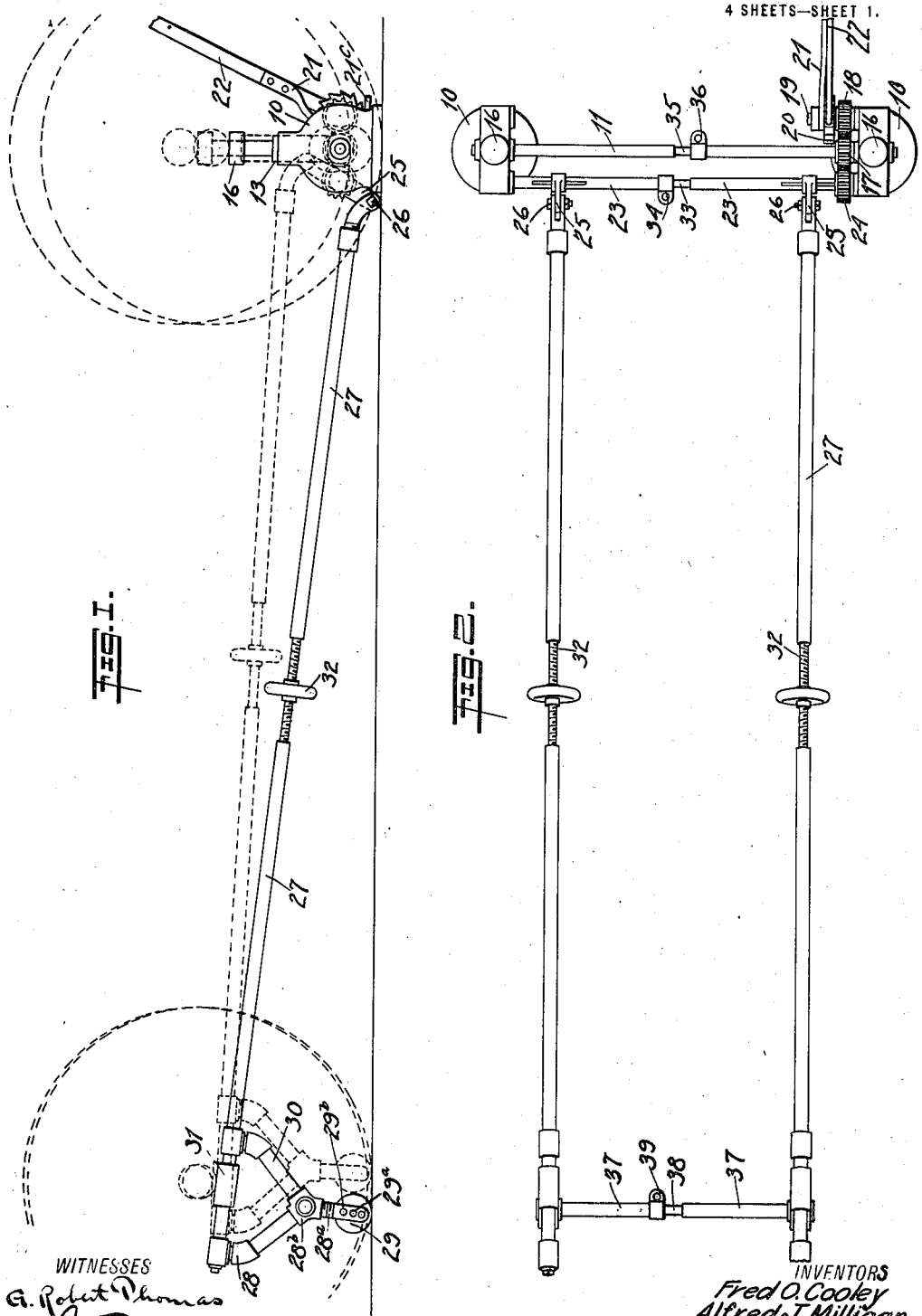

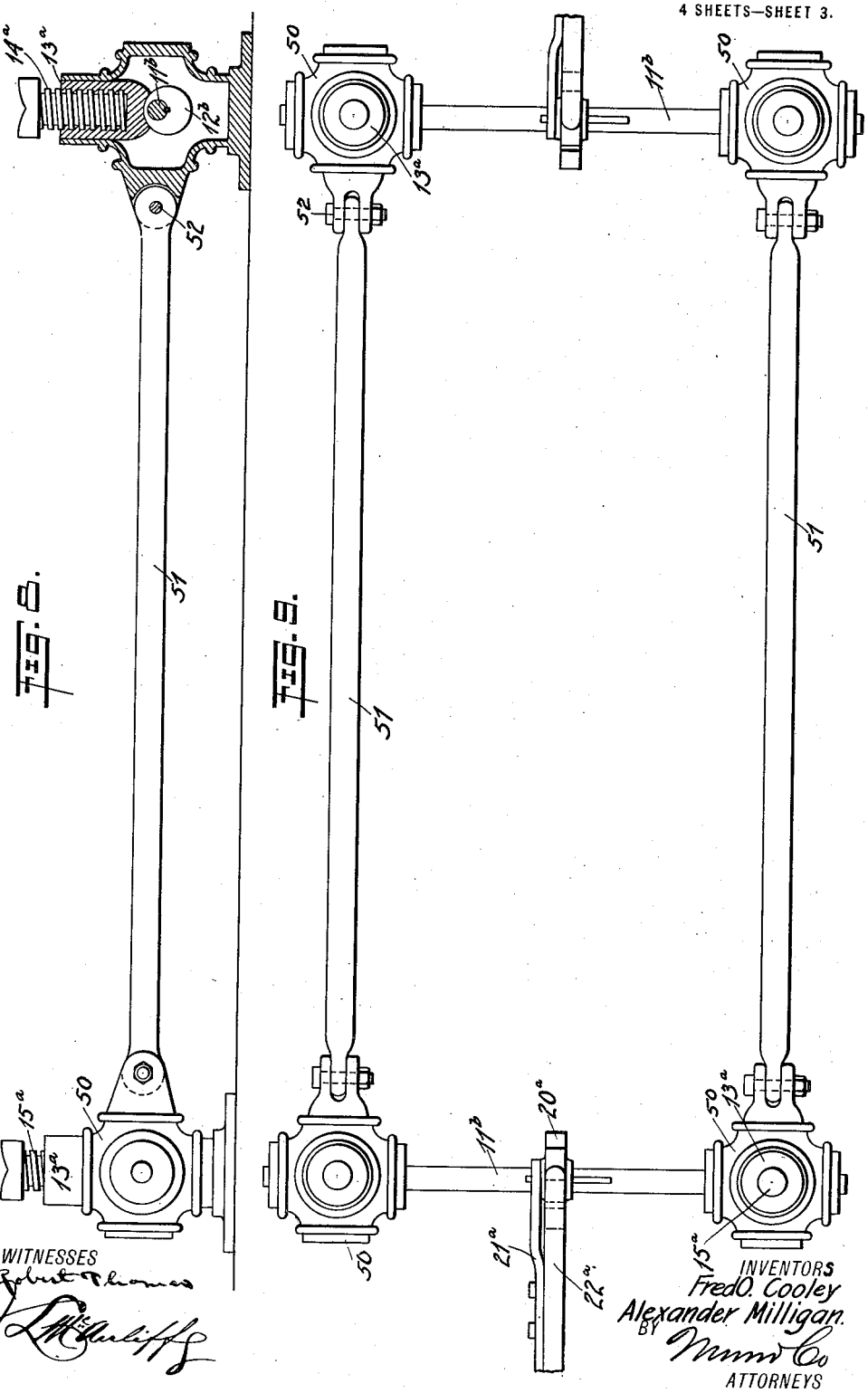

F. O. COOLEY & A. J. MILLIGAN.
AUTOMOBILE JACK.
APPLICATION FILED NOV. 27, 1914.
1,167,049.
Patented Jan. 4, 1916.
4 SHEETS—SHEET 4.
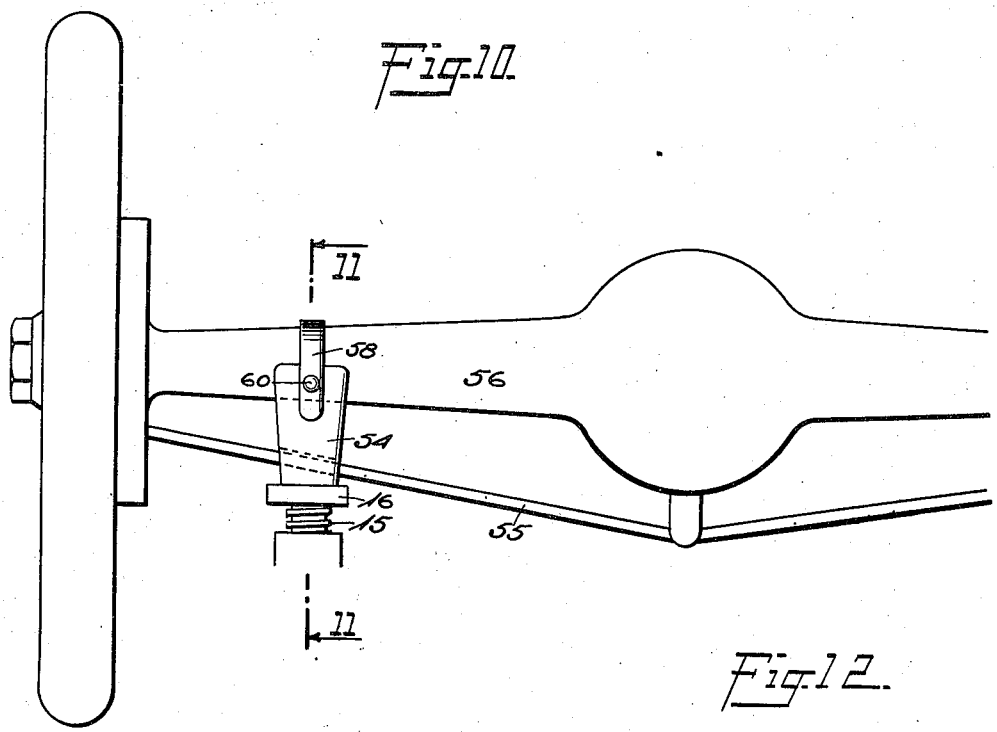
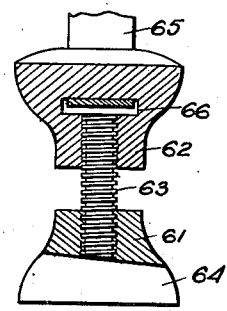
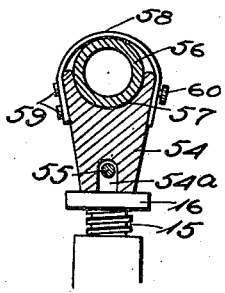
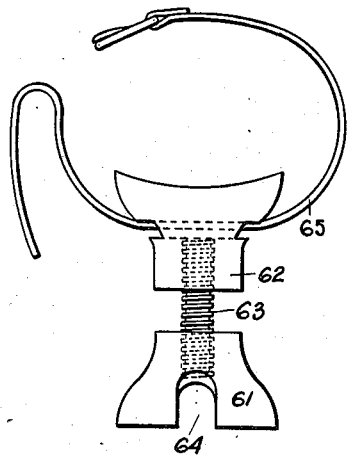
WITNESSES
INVENTORS
Fred O. Cooley
Alfred J. Milligan
BY
ATTORNEYS

UNITED STATES PATENT OFFICE.

FRED O. COOLEY AND ALFRED J. MILLIGAN, OF DULUTH, MINNESOTA.

AUTOMOBILE-JACK.

1,167,049.  Specification of Letters Patent.  Patented Jan. 4, 1916.

Application filed November 27, 1914. Serial No. 874,196.

*To all whom it may concern:*

Be it known that we, FRED O. COOLEY and ALFRED J. MILLIGAN, citizens of the United States, and both residents of Duluth, in the county of St. Louis and State of Minnesota, have invented a new and Improved Automobile-Jack, of which the following is a full, clear, and exact description.

Our invention relates to jacks of the type in which provision is made for jacking up both the front and rear axles of the vehicle.

The invention has for its object to provide automobile jacks of the type indicated improved in various particulars to the end that convenience in operation may be promoted, as well as simplicity of construction.

The invention resides in the various distinctive features characterizing our improved construction, as hereinafter more particularly explained.

Reference is to be had to the accompanying drawings forming a part of this specification, in which similar characters of reference indicate corresponding parts in all the views.

Figure 1 is a side elevation of an automobile jack embodying our invention; Fig. 2 is a plan view thereof; Fig. 3 is a fragmentary vertical section on an enlarged scale, showing the means associated with the rear end of the jack, for operating the latter; Fig. 4 is a section at right angles to Fig. 3; Fig. 5 is a fragmentary sectional side elevation of the operating lever and ratchet, the rear shaft of the jack being in section; Fig. 6 is a view similar to Fig. 3, but showing fluid-driven means for operating the shaft; Fig. 7 is a vertical section at right angles to Fig. 6; Fig. 8 is a partly sectional side elevation showing a modified form; Fig. 9 is a plan view of the form shown in Fig. 8; Fig. 10 is a rear view showing a spacer device for use with a jack, showing the application of the same to an axle and a truss rod on the latter whereby to relieve the truss rod of pressure when employing the jack, Fig. 11 is a cross sectional view on the line 11—11 of Fig. 10. Fig. 12 is a side elevation of a modified spacer device, and Fig. 13 is a fragmentary vertical section of said modified device.

Referring particularly to Figs. 1 to 5, the structure is generally rectangular in form, and at the rear end of each side, jack stands 10 are provided. Extending transversely from one stand to the other is a shaft 11 journaled in said stands. On the ends of the shaft 11, in the hollow interior of each stand is an eccentric disk 12, resting on which is a plunger 13, the lower end of which is concave, to conform to the periphery of the eccentric disk 12. The plunger 13 operates in a cylinder 14, consisting of a neck extending upwardly from the hollow stand 10. In each plunger 13 is a jack screw 15, having a suitable head 16, so that the rear axle of an automobile may rest on the respective heads 16. The jack screw 15 affords an adjustment to suit the height of the rear axle on the particular car, so that the heads 16 will lie close to the under side of the axle when the jack is placed in position beneath the axle. The plungers 13 are raised by giving turning movement to the shaft 11 and eccentric disks 12. In the form shown in Figs. 1 to 5, the means for turning the shaft 11 and disks 12 is as follows: Keyed on said shaft is a pinion 17, meshing with which is a pinion 18 on a stud shaft 19. The stud shaft 19 has also fixed thereon a ratchet wheel 20, which is engaged by a pawl 21 on a hand lever 22. The arrangement is such that on a proper movement of the lever 22, the shaft 11 is turned, and with it the eccentric disks 12, thereby raising the plungers 13 and thus raising the rear axle and rear wheels of the automobile, as indicated in dotted lines in Fig. 1. A holding dog 21$^c$ is pivoted on the base 10 below the ratchet wheel 20, as at 21$^b$, and serves to prevent retrograde movement of the latter when the pawl 21 is being shifted by the lever 22 to take a fresh hold. The jacks and the load may be lowered by throwing in the pawl 21 and dog 21$^c$ alternately, as will readily be understood. In order to raise the front axle and front wheels of the car simultaneously with the described raising of the rear axle and wheels, we provide operative connections between the described devices at the rear end and jack devices at the front end. Journaled in the stands 10 is a second transverse shaft 23 having a pinion 24 meshing with the pinion 17 on the shaft 11. The shaft 23 has secured thereto radial arms 25, connected with which, by bolts 26 or equivalent means, are longitudinal rods 27. These rods 27 extend forwardly and are connected at their front ends with frames 28, which are arranged for jacking the front axle. The frames 28 are generally of Y-shape, the lower end of each of which carries a runner wheel 29 for supporting the frame. The arms 30 of each front frame 28 are secured to a rod 27, the front ends of which rods are thus utilized to form the top bars of said frames 28. Between the said arms 30 each rod receives loosely thereon a sleeve 31 on which the front axle of the automobile rests. In use, the rods 27 will incline to the horizontal when the jack is to be operated, and the frames 28 will be tilted so that the top bars thereof and the slidable sleeves 31 will be inclined to the horizontal. When the rear plungers 13 are elevated by a movement of the lever 22, it will be seen that motion is communicated through the gears 17 and 24 to the shaft 23, the turning of which will cause the arms 25 thereon to be turned through an angle to give a forward and upward, and then a rearward movement to the rods 27, causing the front frames 28 to be rocked upwardly on their wheels 29 and shifted rearwardly relatively to the sleeves 31 on which the front axle rests. The movement of the front jack frames 28 will be from the position shown in full lines in Fig. 1 to the dotted line position in said figure. Thus initially, the rods 27 incline downwardly from the front frames 28, and will be raised to an approximately horizontal position in the operation of the lever 22. The raising of the rods 27 will raise the front axle of the car sufficiently to relieve the front wheels of the weight of the car. To provide for adjusting the jack in accordance with the wheel base of the particular car, the rods 27 may have a turnbuckle 32 interposed therein. Similarly, to adjust the width of the structure, the shafts 11 and 23 are divided and made adjustable by any suitable means. As here shown, one member of the shaft 23 has an extension 33 entering the opposite shaft section, and said opposite section has any suitable clamp 34 to bind the parts in the adjusted position. The shaft 11 has an extension 35 on one section, and a clamp 36 on the other section. An adjustable transverse connection is provided also between the front jack frames 28, the said connection consisting of a bar 37. The said cross bar 37 is formed in sections, one section having an extension 38 entering the opposite section, and the latter having a suitable clamp 39. It is to be understood that the sections of the rods 11 and 23, and the section of the cross bar 37 carrying the respective clamps 34, 36 and 39, are divided or split longitudinally so that the clamps effect the necessary binding action on the respective extensions 33, 35, and 38. Any other suitable adjustment may be provided. To effect a vertical adjustment of the front jack frames 28, the standards thereof may have a threaded connection 28$^a$ entering the Y-coupling 28$^b$; also the axles or pintles 29$^a$ of the wheels 29 may be received in any one of a vertical series of bearings 29$^b$. In order to provide power-operated means, as shown in Figs. 6 and 7, the jack stands 10$^a$, each fitted with the described plunger 13 and screw 15, afford bearings for a shaft 11$^a$ on which are eccentric disks 12$^a$ for raising the plungers 13. On the shafts 11$^a$ also, are any suitable rotary pistons 40 turning in casings 41 having an inlet 42 and outlet 43 for the passage of a motive fluid.

In Figs. 8 and 9, we have shown a stand designed for use with a particular car and therefore requiring no adjustment to suit varying wheel bases. The structure is generally in the form of a rectangular frame having jack stands 50 at each corner, all these stands and their appurtenances being alike. Thus within the hollow interior of each stand is an eccentric disk 12$^b$ mounted on the front and rear transverse shafts 11$^b$. Resting on the disks are plungers 13$^a$ receiving jack screws 14$^a$. The disks, the operating shafts thereof, the plungers resting on the disks, and the adjustable jack screws are the same in all the constructions. Connecting the front stands 50 with the rear stands are longitudinal side bars 51, which are connected with the respective stands by bolts 52, or equivalent means. On each shaft 11$^b$ is a ratchet wheel 20$^a$, and a pawl 21$^a$ carried by a lever 22$^a$ engages each ratchet wheel, there being a separate lever, pawl and ratchet for each shaft 11$^b$. In order to apply a lubricant between the opposed surfaces of the eccentric disks and the plungers resting thereon, the plungers may be provided with vertical oil holes 53 leading into the bottom of the socket in which the jack screws 15 operate.

In Figs. 10 and 11, a spacer 54 is illustrated, the lower end of which is adapted to seat on the head 16 of the jack screw 15. Said lower end of the spacer is forked to provide a transverse slot 54$^a$ preferably inclined, so that the spacer may arch over a truss rod 55 of an axle 56. The upper end of the spacer is formed with a depression 57 presenting in the present instance a concaved bearing surface to conform to the surface of the round axle 56. To retain the spacer on the axle, a flexible strap 58 is secured to the spacer at one side of the depression 57 by suitable fasteners 59, and is adapted at its free end to be engaged with any suitable fastening device 60 on the spacer at the opposite side after the strap has been brought over the axle. In use, as the head 16 of the jack is raised, lifting force will be exerted on the axle 56 through the spacer 54 so that the truss rod 55 is relieved of all strain. The spacer device may be formed of a base 61 (Figs. 12, 13) and head 62 connected by a stud 63 to adjust the height of the head. The base has a slot 64 to bridge the truss and a strap 65 extends through a slot 66 in the head 62.

Having thus described our invention, we claim as new and desire to secure by Letters Patent:

1. In a jack of the character described, rear jack stands spaced transversely, a shaft having bearings in said stands, eccentric disks on said shaft, means for turning the shaft, plungers engaging the eccentric disks, and rising or falling with the turning of the latter, front jack elements adapted to be tilted in the vertical plane, rods connected with said elements to tilt the same, and means to actuate the rods in unison with the turning of the eccentric disks and the raising and lowering of the plungers.

2. In a jack of the character described, means for jacking one axle of a vehicle, comprising vertically slidable elements, tiltable elements for jacking the other axle of the vehicle, means for raising and lowering the said vertically slidable elements, and co-acting connections to tilt said tiltable elements in unison with the said vertically slidable elements.

3. In a jack of the character described, means for jacking one axle of a vehicle, comprising a vertically movable plunger, a rock shaft, means for raising or lowering the plunger by the turning of said shaft, a rockable element rocking in response to the turning of said shaft, a tiltable co-acting element for the other axle of the vehicle, and a rod connecting the said tiltable element and said rockable element.

4. In a jack of the character described, means for jacking one axle of the vehicle, an arm mounted to rock when the said jacking means are actuated, a rod connected at one end with said rock arm, means for jacking the other end of the vehicle, said latter means comprising a wheeled structure carried by the rod at the end opposite the rock arm to be rocked therewith, and an axle rest on said wheeled structure and slidable relatively thereto in a direction toward or from the rocker arm.

5. In a jack of the character described, jacks for one axle, a shaft extending between the jacks, means for actuating the said jacks by the turning of the shaft, front jacks, means for actuating the front jacks in unison with the rear jacks, and means for turning the said shaft, said means comprising a ratchet wheel on the shaft, a lever loose on the shaft, a pawl on the lever adapted to engage the ratchet wheel, and a holding dog adapted also to engage the ratchet wheel.

In testimony whereof we have signed our names to this specification in the presence of two subscribing witnesses.

FRED O. COOLEY.
ALFRED J. MILLIGAN.

Witnesses:
J. E. COOLEY,
RICHARD A. BRADY.